UNITED STATES PATENT OFFICE.

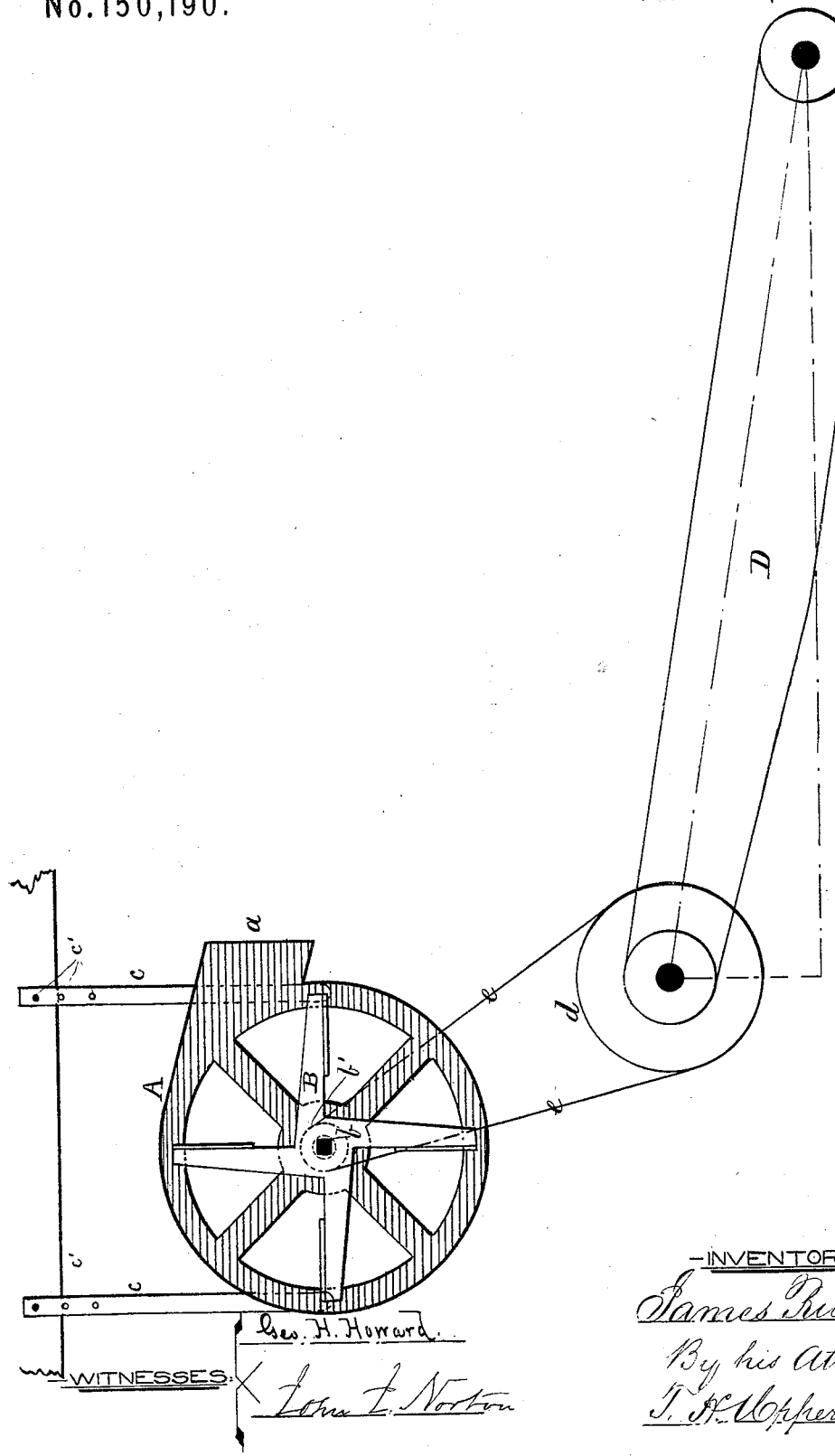

JAMES RICE, OF BATAVIA, OHIO, ASSIGNOR OF ONE-HALF HIS RIGHT TO GEORGE W. HULICK, OF SAME PLACE.

IMPROVEMENT IN HORSE-POWERS.

Specification forming part of Letters Patent No. 150,190, dated April 28, 1874; application filed April 9, 1874.

*To all whom it may concern:*

Be it known that I, JAMES RICE, of Batavia, Clermont county, Ohio, have invented certain Improvements in Horse-Powers, consisting in the application thereto of rotary fan-blowers, for purposes of utility, hereinafter described; and I do hereby declare that in the following specification is contained a full, clear, and exact description of my said invention, reference being had to the accompanying drawing and to the letters of reference marked thereon.

My invention relates to the application of a portable rotary fan-blower to the endless tread-board of the horse-power of a thrashing or other machine, in such wise that rotary motion may be transmitted from some suitable point in the machine to a pulley upon the blower-shaft. The revolutions of the fan thus produced are intended to cool the horses, protect their heads from flies or other troublesome insects, and to preserve the surrounding atmosphere of inhalation clear from dust and other impurities. While humanity alone would seem to suggest some such provision for the comfort of the laboring animal, the increased endurance and renewed powers of a horse working in comparative ease would fully justify some contrivance to effect a result so desirable.

The accompanying drawing forming a part of this specification represents an elevation of the endless tread-board of a horse-power, and the fan and casing in section.

A is an ordinary cylindrical casing of a fan-blower, having an air-discharge opening, $a$. B is a four-winged fan-blower centered upon the shaft $b$, supported and revolving within journals formed in the ends of the cylindrical casing. These ends are constructed with openings of such area as will allow the ingress of air in sufficient quantity. A pulley, $b'$, is placed at one end or at both ends of the shaft. The fan and casing are suspended by hangers C, connecting at their respective ends with the casing and some suitable points of suspension above. The upper end of the hangers may be provided with eyes $c'$, spaced some distance apart, by means of which the height of the air-discharge opening may be regulated with reference to the position of the heads of the working animals. D is the endless tread-board of the horse-power. The rotary motion is transmitted from the wheel or wheels $d$ to the pulley or pulleys $b'$ of the fan-shaft by a belt, $e$.

Other modes of applying the belt might be used.

I claim nothing in the construction of the fan or the horse-power in itself; but

What I claim as new, and wish to secure by Letters Patent of the United States, is—

A portable fan-blower in combination with, and operated conjointly with and by means of, a horse-power, substantially as and for the purposes hereinbefore set forth.

In testimony whereof I have hereunto signed my name.

JAMES RICE.

Witnesses:
 GEO. W. HULICK,
 JAMES HULICK.